United States Patent [19]
Ebenfelt

[11] Patent Number: 5,431,710
[45] Date of Patent: * Jul. 11, 1995

[54] METHOD FOR CONTINUOUSLY PRODUCING IRON, STEEL OR SEMI-STEEL AND ENERGY

[76] Inventor: Li W. Ebenfelt, 250 East 54th St., New York, N.Y. 10022

[*] Notice: The portion of the term of this patent subsequent to Nov. 2, 2010 has been disclaimed.

[21] Appl. No.: 47,124

[22] Filed: Apr. 14, 1993

Related U.S. Application Data

[63] Continuation-in-part of Ser. No. 788,785, Nov. 6, 1991, Pat. No. 5,258,054.

[51] Int. Cl.$^6$ .............................................. C21B 13/14
[52] U.S. Cl. ......................................... 75/443; 75/501; 75/958
[58] Field of Search ........................... 75/443, 501, 958

[56] References Cited

U.S. PATENT DOCUMENTS

| | | |
|---|---|---|
| 841,212 | 1/1907 | Adams et al. |
| 1,567,934 | 12/1925 | Ferguson |
| 1,775,713 | 9/1930 | Baily |
| 1,799,643 | 4/1931 | Rogers |
| 3,136,622 | 6/1964 | Pratt et al. ............................. 75/10 |
| 3,150,958 | 9/1964 | Collin et al. |
| 3,163,520 | 12/1964 | Collin et al. |
| 3,463,472 | 8/1969 | Worner .............................. 266/11 |
| 3,617,042 | 11/1971 | Nakagawa |
| 3,734,716 | 5/1973 | Seglin et al. |
| 3,734,717 | 5/1973 | Seglin et al. |
| 4,200,265 | 4/1980 | Berndt et al. |
| 4,434,003 | 2/1984 | Geskin ................................. 75/24 |
| 4,849,015 | 7/1989 | Fassbinder et al. ................ 75/26 |
| 4,861,369 | 8/1989 | Von Bogdandy et al. ........... 75/958 |
| 4,976,776 | 12/1990 | Elvander et al. ................... 75/502 |
| 5,013,355 | 5/1991 | Elvander et al. |

FOREIGN PATENT DOCUMENTS 747868 6/1933 France.
1046675 10/1966 United Kingdom.

OTHER PUBLICATIONS

Processes and Materials of Manufacture, Third edition, B. A. Lindberg, Allyn and Bacon, 1983, pp. 19–99.
Processes and Materials of Manufacture, Third edition, R. A. Lindberg, Allyn and Bacon, 1983 pp. 345–392.
Metals Handbook Edited by H. E. Boyer and T. L. Gail, American Society for Metals, 1985, pp. 22-1 to 22-10.
Metals Handbook Edited by H. E. Boyer and T. L. Gail, American Society for Metals, 1985, pp. 23-1 to 23-64.

Primary Examiner—Melvyn J. Andrews
Attorney, Agent, or Firm—Darby & Darby

[57] ABSTRACT

A fine particle mixture of iron concentrate and pulverized flux is introduced into the upper portion of the vertical prereduction section of a sealed unitary vessel. Heated gas partially reduces the iron concentrate particles to form wustite which falls to the lower portion where it is melted to form fluid slag. The slag passes into the horizontal section of the vessel which is divided by a barrier into a reduction portion and an oxidation portion. In the reduction portion, pulverized coal and oxygen are introduced and iron oxide in the slag is reduced to iron. The entrained iron droplets in the slag are permitted to sediment in a quiescent zone where the slag is removed. The molten iron may be recovered or converted into steel by flowing through passages in the lower portion of the barrier into the oxidation portion where oxygen is introduced to remove C, Si, P and other impurities and to convert iron into steel or semi-steel. The final product and slag are separately removed from the oxidation portion. Exhaust gases, produced in the prereduction, reduction and oxidation steps, are recovered and used to generate power and optionally recycled as reducing gas for use in the prereduction section.

20 Claims, 6 Drawing Sheets

METHOD FOR CONTINUOUSLY PRODUCING IRON, STEEL OR SEMI-STEEL AND ENERGY

This application is a continuation-in-part of U.S. patent application Ser. No. 07/788,785, filed Nov. 6, 1991, now U.S. Pat. No. 5,258,054. The present invention relates to steel and energy production and more particularly to a method of continuously producing iron, steel or semi-steel and energy from fine iron ore and pulverized coal in a sealed unitary vessel, which is economical to build and operate, energy efficient, and produces minimal pollutants.

BACKGROUND OF THE INVENTION

Current iron and steel making processes in integrated steel plants use a blast furnace to produce molten iron and a separate basic oxygen furnace to convert the molten iron into steel. The modern blast furnace is a huge facility whose construction requires very high capital investment. For example, a furnace capable of producing 5,000 tons of iron a day would require an investment of more than $200 million. The blast furnace uses coke as fuel, reductant, and most importantly to support the moving bed to allow the passage of exhaust gas without causing excessive pressure drop.

The coke oven represents another large investment and also involves substantial environmental problems. A battery of coke ovens, capable of producing 3,000 tons of coke a day, require an investment of about $200 million.

The extent of iron ore preparation required by the blast furnace also contributes to the high cost of the process. A sinter plant capable of producing 5,000 tons of iron a day would require an investment of about $100 million.

The huge investment costs of the conventional blast furnace, the coke ovens and the sinter plant, as well as the environmental problems associated with the coke ovens and the sinter plants have prevented the building of new blast furnaces. Accordingly, there is a need in the art for a method and apparatus for producing iron, steel or semi-steel which eliminates high capital investment and operating costs and is energy efficient and environmentally safe.

SUMMARY OF TEE INVENTION

The present invention relates to a method and apparatus for continuously producing iron, steel or semi-steel and energy. The process employs pulverized coal as fuel and reductant instead of coke, whose production causes major environmental problems. Additionally, fine iron ore concentrate is used instead of agglomerates, thus eliminating sintering and pelletizing steps which are generally required in the conventional blast furnace process. Both thermal and chemical energies in the high temperature exhaust gas generated by the present invention are recovered to enhance energy conservation and reduce cost.

The present invention provides a sealed unitary vessel for continuously producing iron, steel or semi-steel from iron ore concentrate and pulverized coal. The vessel includes a vertically extending prereduction section which has an upper and a lower portion and an interconnected horizontally extending reduction-oxidation section which has a barrier or partition wall dividing it into a reduction chamber and an oxidation chamber. The barrier has a number of passages in its lower portion to allow for passage of molten iron from the reduction chamber to the oxidation chamber.

According to the present invention, a mixture of fine particles of iron ore concentrate and pulverized flux is continuously introduced into the upper portion of the vertically extending prereduction section of the vessel. Heated reducing gas is introduced into the prereduction section to heat and partially reduce the iron concentrate particles to form wustite, a black iron oxide or ferrous oxide (FeO) with varying amounts of ferric oxide ($Fe_2O_3$). The wustite is melted in the lower portion of the prereduction section to form fluid slag with the flux. The fluid slag then flows into the horizontal smelting-reduction chamber of vessel whereby iron oxides, e.g. FeO, contained in the slag are reduced to iron metal by the introduction of pulverized coal and industrial pure oxygen or oxygen enriched air. The slag is permitted to settle in a quiescent zone located in the reduction chamber to sediment the entrained molten iron droplets. Molten iron may be recovered at this stage or may be converted into steel or semi-steel by a subsequent oxidation step.

Molten iron flows from the quiescent zone through passages in the lower portion of a barrier into the oxidation chamber of the vessel where industrial pure oxygen is introduced to convert the molten iron into steel or semi-steel by removing carbon, silicon, phosphorus and other impurities. The end product is removed and exhaust gas is recovered from the vessel. A portion of the exhaust gas, after passing through a waste heat boiler to release heat and a gas cleaning system to remove fine dust particles, may be reused in the prereduction chamber. Steel or semi-steel produced by the process of the present invention may be further refined or alloyed in a ladle, as required.

In comparison with the conventional iron and steel making process, there are a number of advantages associated with the method and apparatus of the present invention. One advantage is that the reduction and oxidation steps are performed in a single process chamber which eliminates problems associated with the transfer of intermediate products from one apparatus to another, thus considerably reducing the capital cost and environmental problems as well as increasing the thermal efficiency of the process.

A second advantage is that the CO-enriched exhaust gas produced in the oxidation stage may be integrated into the bulk exhaust gas and its thermal and chemical energies can, therefore, be utilized to generate electricity and to prereduce the iron concentrate. For example, assuming molten iron is produced in the reduction stage containing 4% carbon and the carbon rate is 500 kg per mt of molten iron, a 6% saving in coal rate is expected to be obtained if the energy in the exhaust gas produced in the oxidation stage is fully utilized.

When the process of the invention is operated at a "low energy mode", the objective is to produce iron, steel or semi-steel with minimal expenditure of coal. Hot process gas recovered from the prereduction, reduction and/or oxidation sections and containing ratio of $CO+H_2$ to $CO+H_2+CO_2+H_2O$ ranging between about 40 and about 50% is used in generating electricity, after sensible heat recovery and dust removal, and may be recycled as reducing gas for use in the prereduction step.

When the process is operated at a "high energy mode", the objective is to produce electricity as well as iron, steel or semi-steel. Additional coal is used in the reduction section and the combined hot CO-enriched process gas generated from the prereduction, reduction and/or oxidation sections and having a ratio of $CO+H_2$ to $CO+H_2+CO_2+H_2O$ ranging between about 20% and about 40% is introduced into a gas turbine to generate electricity, after sensible heat recuperation and dust removal. Recirculation of the process gas to the prereduction section is no longer needed as the reducing gas required for prereduction is provided by oxygen coal burners located at the upper portion of the prereduction shaft. By decreasing the post-combustion ratio of $CO+H_2$ to $CO+H_2+CO_2+H_2O$ in the final reduction section from about 40% or 50% to about 20%, the amount of electric energy generated per tonne of hot metal produced can be trebled or quintripled. The co-production of iron, steel or semi-steel and energy in a single method and apparatus is a big advantage to areas where coal and iron ores are abundant, but electric energy is scarce.

DETAILED DESCRIPTION OF THE INVENTION

Figure 1:
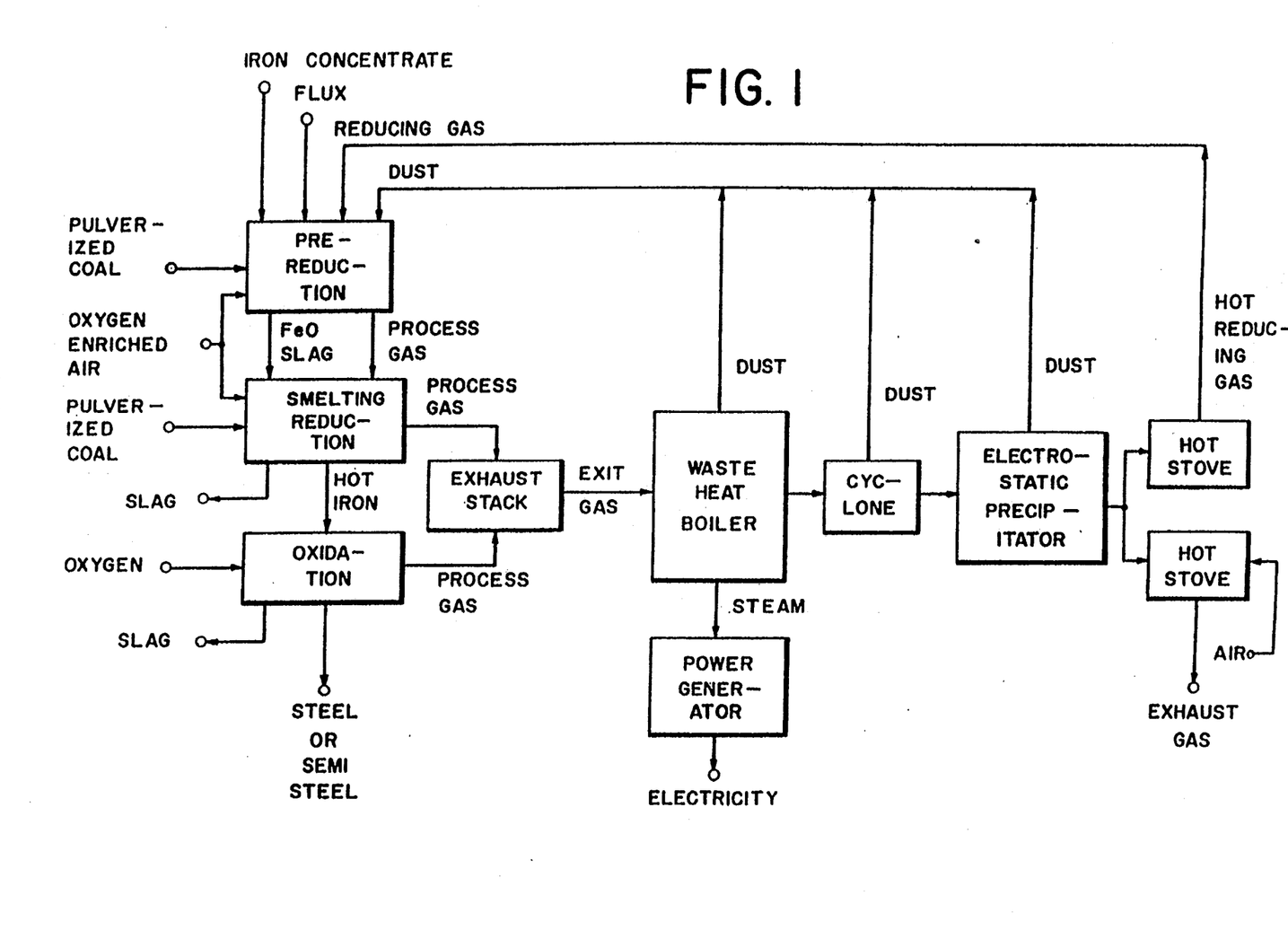
FIG. 1 is a flow chart of the method of the present invention.

As schematically depicted in FIG. 1, iron ore concentrate and pulverized flux are charged by two separate screw conveyors into a hopper, from which the mixture of fine particles descends to the prereduction shaft. The use of screw conveyors for the transfer of the fine iron ore and flux particles allows precise measurement of the feed rate and permits a good seal of the prereduction shaft. A gas distribution system is used to ensure radial dispersion of the fine particles within the shaft.

In practicing this invention, the amount of total iron in the iron ore concentrate should range between about 70% and about 50 wt. %, preferably above 60%. The particle mesh size of the iron ore concentrate broadly ranges between about 50 $\mu$m and about 200 $\mu$m, preferably below 150 $\mu$m.

Suitable, but not limiting, examples of flux include lime, limestone, magnesia and fluorspar. The particle size of the flux generally ranges between about 50$\mu$m and about 200 $\mu$m, preferably below 150 $\mu$m.

The descending iron ore/flux mixture is heated and partially reduced to form wustite in the upper portion of prereduction shaft at a temperature ranging between about 1000° C. and about 1300° C., preferably about 1200° C., and at a relative pressure ranging between about 0 bar and about 0.3 bars, preferably about 0.1 bar, in the presence of a reducing gas blown in through tuyeres which are located near the top of the shaft. Oxygen-coal burners located at the upper and bottom portions of the shaft, provide heat required for reduction and for melting wustite and flux particles, respectively.

The reducing gas consists mainly of CO, $CO_2$, $H_2$, $H_2O$ and $N_2$, maintained at a ratio of $CO+H_2$ to $CO+CO_2+H_2+H_2O$ ranging between about 0.3 and about 0.6, preferably about 0.5, which is thermodynamically sufficient to reduce iron ore to wustite. The reducing gas is pre-heated to a temperature ranging between about 1000° C. and 1300° C., preferably about 1200° C., and introduced into the shaft at a flow rate ranging between about 1000 $Nm^3$/min and about 2000 $Nm^3$/min, preferably about 1600 $Nm^3$/min for a furnace producing 100 mt hot metal per hour.

Thereafter, the molten FeO slag enters a rectangular or cylindrical cross-sectional shaped horizontal chamber where it is reduced by pulverized coal injected from the top of the chamber. The process heat required by the endothermic iron reduction reaction is provided by partial combustion of the coal and by post combustion of CO gas produced from iron reduction, with industrial pure oxygen or oxygen enriched air introduced through top lances.

The amount of pulverized coal injected into the molten slag broadly ranges between about 500 kg and 1000 kg per 1000 kg of hot metal produced, depending on the type of coal that is used in the process. The reduction reaction is conducted at a temperature of about 1500° C. Industrial pure oxygen or oxygen-enriched air (>60% $O_2$) is introduced into the reduction chamber at a rate required by reaction stoichiometry, e.g., iron oxide reduction and carbon combustion reactions.

Slag produced during the reduction stage is tapped out of the furnace after settling down in a relatively quiescent zone of the chamber to sediment the entrained metallic iron. Thereafter, the molten iron produced is introduced through a submerged passage in a barrier or dam into the oxidation chamber.

In most of the emerging smelting-reduction processes for iron-making, separate vertical or horizontal furnaces are used. In those furnaces, violent agitation of the bath created by air or oxygen injection makes the iron concentration in the slag much higher than its equilibrium concentration. This is due to the entrainment of iron droplets in the slag. To overcome this problem, this invention provides a relatively quiescent zone in the smelting-reduction chamber to allow settling which in turn results in better slag-metal separation. Thus, the slag tapped from the smelting-reduction chamber of the present invention would have much lower iron concentration.

In the smelting-reduction stage, FeO in the slag is reduced by carbon dissolved in the iron. Carbon is provided continuously by pulverized coal which is fed through top lances. Since carbon dissolves rapidly in the molten iron, the overall rate of iron reduction depends on the rate of mass transfer of carbon and FeO to the reaction interface. Therefore, bath agitation plays a prominent role in achieving a high reaction rate. On the other hand, the highly endothermic reaction for iron reduction requires an effective heat transfer from the process gas to the molten bath. In both cases, good agitation and mixing of the molten bath are needed and ensured by top and bottom injections.

The molten iron produced in the smelting-reduction chamber passes through submerged passages in a partition or barrier wall and enters an oxidation chamber, where iron is converted to steel or semi-steel. The thickness of the wall and the size of the passages are designed to minimize back mixing. Industrial pure oxygen is injected from the top of the chamber to remove C, Si and P contained in the molten iron. The oxidation chamber has a temperature ranging between about 1650° C. and about 1550° C., preferably about 1600° C., and a relative pressure ranging between about 0 bar and about 0.3 bar, preferably ranging between about 0.1 bar.

The high temperature exhaust gases produced from prereduction, smelting/reduction and oxidation zones exit the process vessel through an exhaust stack. By passing through a waste heat boiler and a gas cleaning system (a cyclone and an electrostatic precipitator), the flue gas releases most of its heat which is then converted into steam and may be used to generate electricity. The fine particles contained in the flue gas are also eliminated from the exhaust by the gas cleaning system. The cool clean gas, which contains abundant CO, is preferably partially recycled to the prereduction shaft, after being heated to about 1200° C. in a hot stove, which preferably utilizes some of the surplus exhaust gas as fuel.

The use of a hot stove to heat a part of the clean flue gas which is recycled to the prereduction shaft makes full use of the energy contained in the flue gas (particularly when the surplus gas is used as fuel for the hot stove) and provides precise control of the reducing gas temperature before the gas is blown to the prereduction shaft. The use of hot stoves as heat exchangers is unique in coal-based iron and steel making.

Without being bound to any theory of operation for this invention, the pre-reduction of iron ore concentrate involves the reduction of iron oxides, e.g., $Fe_2O_3$ and $Fe_3O_4$, by CO into wustite, a black iron oxide or ferrous oxide (FeO) containing variable amounts of ferric oxide ($Fe_2O_3$). Thereafter, FeO is reduced to metallic iron using carbon as a reductant. The reduction reactions are as follows:

Pre-reduction reactions:

$Fe_2O_3 + CO \rightarrow 2FeO + CO_2$ $Fe_3O_4 + CO \rightarrow 3FeO + CO_2$

Reduction reactions:

$FeO + C \rightarrow Fe + CO$

The process of the present invention is performed in a single, well sealed vessel which produces iron, semi-steel or steel continuously from pulverized iron ore and coal. As shown in FIGS. 2–5 of the drawings, the vessel comprises a vertical prereduction shaft, generally designated A, a horizontal reduction-oxidation hearth, generally designated B, and a gas exhaust stack, generally designated C.

The vertically extending prereduction shaft (A) which has an upper and a lower portion and includes means for: introducing a fine particle mixture of iron ore concentrate and pulverized flux into the upper portion; introducing heated gas to heat and partially reduce the iron particles to form wustite; and melting wustite in the lower portion to form fluid slag.

The upper portion of the prereduction section includes an inlet and means for introducing the fine particle mixture which includes a hopper having an outlet and means for sealingly connecting the hopper outlet and the inlet. A first feed bin is adapted to contain fine particles of dry iron concentrate. A second feed bin is adapted to contain fine particles of pulverized flux. Screw conveyor means are employed for conveying particles from the bins to the hopper. Valve means are provided for sealing each of the feed bins. A supply of distribution gas is also provided. A conduit connects the distribution gas supply to the hopper outlet connecting means. Means are provided for cooling the connecting means. Radially directed particle distribution means are provided at the end of the connecting means.

Tuyere assembly means are provided for introducing the heated gas into the upper portion of the prereduction section. Burner means are provided in the lower section to produce a high FeO fluid slag.

The interconnected horizontally extending reduction-oxidation hearth (B) which has a barrier dividing it into a reduction portion and an oxidation portion. The reduction portion further includes a reduction zone which receives the slag and a quiescent zone. The hearth includes means for introducing pulverized coal and oxygen enriched air into the reduction zone. In the quiescent zone, the reduced slag is permitted to sediment before it is removed. The barrier extends from the floor of the reduction-oxidation section to a point above the surface of the fluid and has flow passages connecting the quiescent zone and the oxidation portion. The hearth also includes means for: introducing oxygen in the oxidation portion; removing the end product from the oxidation portion; and removing exhaust gases from the vessel. The exhaust gas removing means extends from the reduction-oxidation section and includes an exhaust gas outlet.

Lance means located above the fluid surface are provided for introducing industrial pure oxygen or oxygen-enriched air into the reduction zone and for introducing industrial pure oxygen into the oxidation zone. Tuyere means located below the fluid surface are provided for introducing agitation gas within the oxidation portion.

The slag outlet means in the quiescent zone are located at a level above the barrier passages. Means are provided for introducing an inert agitation gas into the quiescent zone. Tuyere means located below the surface of the fluid are utilized for this purpose.

The reduction-oxidation section includes a floor which is preferably inclined with respect to the horizontal. The floor is inclined toward the end product means.

Waste heat recapture means are preferably located in the exhaust gas removal means. Means for cleaning the exhaust gas are preferably connected to the exhaust gas outlet.

Means are provided for heating a portion of the exhaust gas for feedback to the prereduction section. The heating means has a fuel inlet connected to the exhaust gas outlet such that some of the exhaust gas may be used as fuel.

The prereduction section preferably comprises a substantially cylindrical shaft. The reduction-oxidation portion preferably has either a circular or rectangular cross-sectional configuration.

The exhaust gas removal means preferably extends vertically above the reduction-oxidation section. Slag outlet means are preferably located in the oxidation section as well as in the quiescent zone. The slag outlet means in the oxidation section is located above the end product outlet means.

The step of introducing the fine particle mixture includes charging a hopper with fine particles of dry iron ore concentrate and pulverized flux from feed bins by screw conveyors. The hopper has an outlet sealingly connected to the inlet in the upper portion of the prereduction section. Distribution gas is introduced into the inlet. The inlet is also cooled. The particles are radially directed by the distribution gas as they enter the upper portion.

Industrial pure oxygen or oxygen enriched air is introduced into the reduction portion at a level above the surface of the fluid. Slag is removed from the quiescent zone from a level above the barrier passages. Agitation gas is introduced into the quiescent zone to assist sedimentation of the entrained iron droplets.

Oxygen is introduced into the oxidation section at a level above the surface of the fluid. Agitation gas may be introduced into the oxidation portion.

The floor of the vessel is preferably inclined. Waste heat preferably is recaptured from the exhaust gas. A cyclone is preferably connected to receive the exhaust gas. Dust particles are preferably electrostatically precipitated out of the exhaust gas. A portion of the exhaust gas may be heated and recycled to the prereduction section. A portion of the exhaust gas preferably is used to fuel the exhaust gas heater.

Waste slag also is removed from the oxidation portion. The slag is removed from the oxidation portion at level above the level at which the end product is removed.

Figures 4, 6:
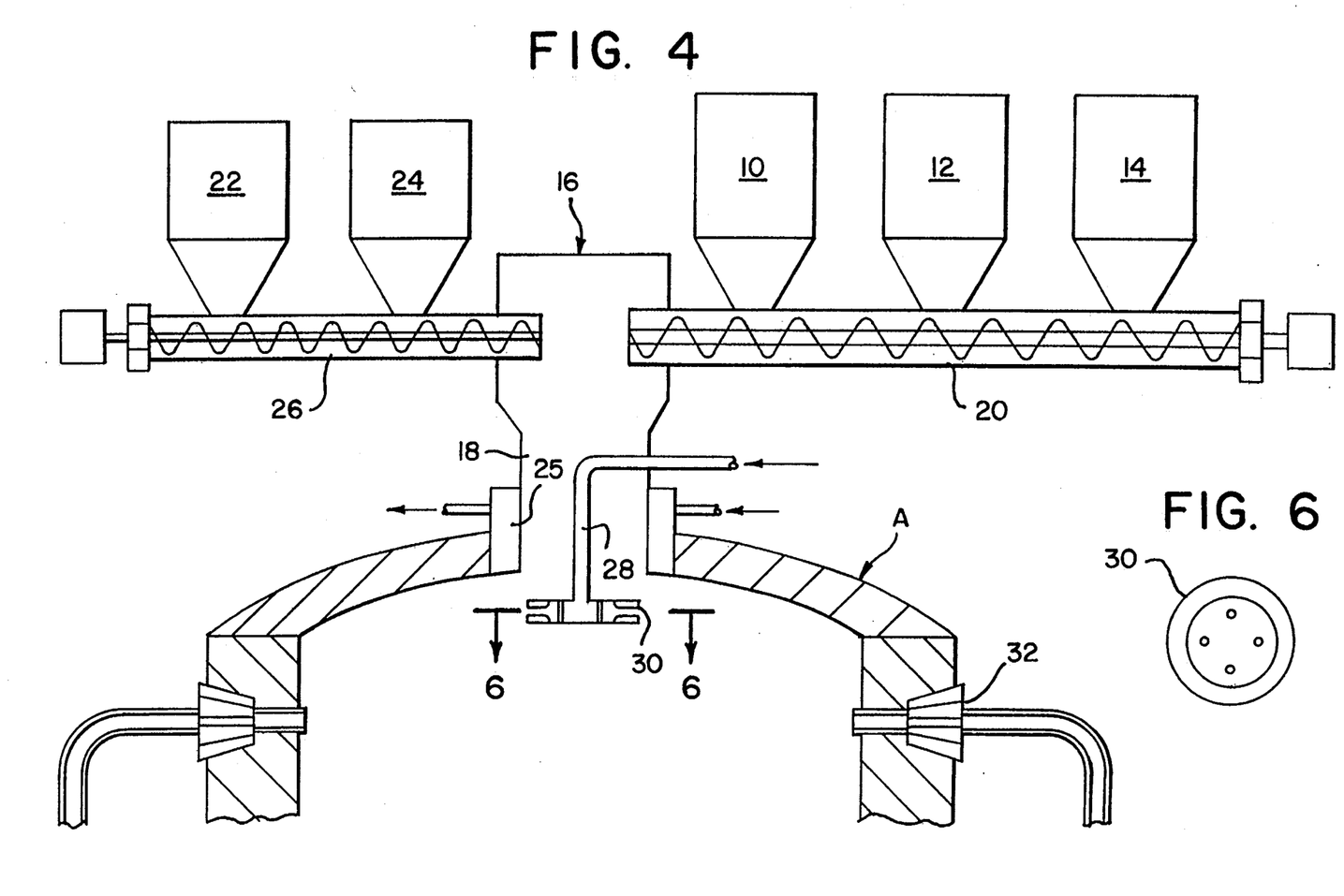
FIG. 4 is a front elevational view of the feed mechanism associated with the vessel of the present invention.
FIG. 6 is a sectional view taken along line 6—6 of FIG. 4.
Figure 5:
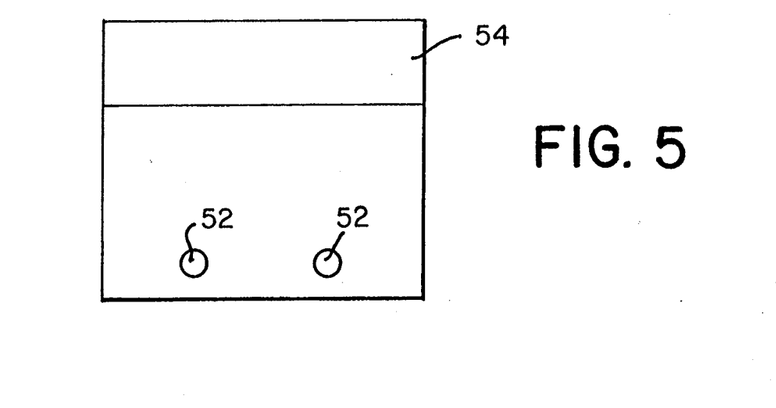
FIG. 5 is a front elevational view of the barrier of the vessel of the present invention showing the fluid passages.

As shown in FIG. 4, the material feeding system is located over the top of the prereduction shaft A. The dry iron concentrate, contained in three normally sealed feed bins 10, 12 and 14, is first charged to a sealed hopper 16, which is located over prereduction shaft inlet 18, through a screw conveyor 20. A valve is provided at the bottom of each bin which closes when the bin is receiving feed from the feed storage. This prevents air infiltration into the prereduction shaft.

The fine flux particles contained in two bins 22, 24, are also fed into hopper 16 by another screw conveyor 26. The fine particles, blended in the hopper, descend to the prereduction shaft inlet 18 where the particles are distributed by a stream of cold reducing gas, which flows through an inner concentric tube 28, and discharges radially into the shaft. The slot 30 at the end of tube 28 is designed in such a way that the passing gas has sufficient kinetic energy to distribute the fine particle mixture evenly into prereduction shaft A. A water cooling block 25 is used to cool hopper 16.

Figure 2:
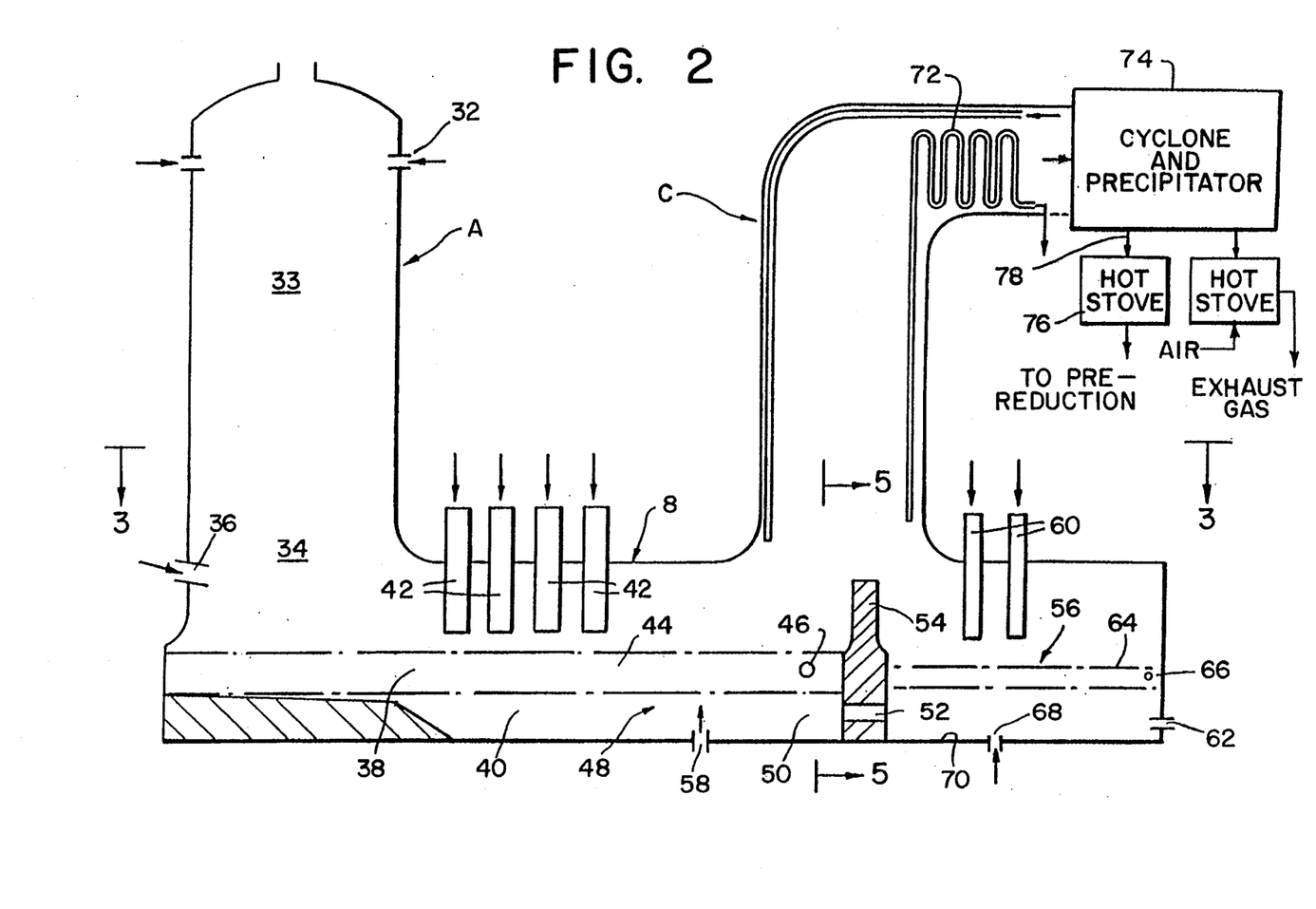
FIG. 2 is a cross-sectional side view of the vessel of the present invention.
Figure 3:
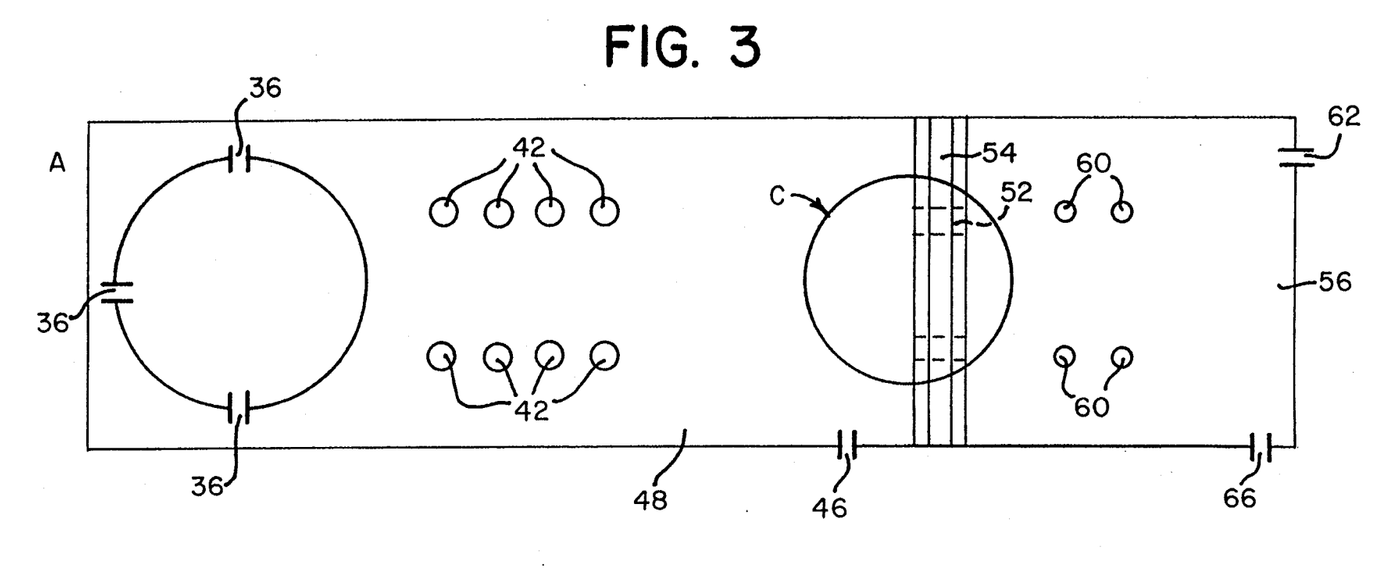
FIG. 3 is a top view of the vessel of FIG. 2, taken along line 3—3.

As shown in FIG. 2, in the prereduction shaft A, the descending iron ore particles are heated and reduced to wustite by hot reducing gas which is blown in through tuyeres 32, located in the upper part 33 of shaft A. In the bottom part 34 of the shaft, the partially reduced iron ore is melted after passing through the high temperature zone 34, as a result of coal combustion in front of burners 36, to form a high FeO fluid slag 38. The fluid slag 38 will then enter the reduction hearth 40.

In the reduction hearth 40, pulverized coal is injected along with industrial pure oxygen or oxygen enriched air through the top lances 42. The high FeO slag 38 is reduced to iron by the dissolved carbon in the molten metal. The fluid slag 44 produced at this stage is tapped out through a tapping hole 46, after passing through the quiescent zone 48 to sediment the entrained iron droplets.

To increase the separation rate and efficiency of separation between the slag and molten iron in the quiescent zone 48, it may be desirable to include additional barriers between the reduction zone and the quiescent zone or alternatively to lengthen the quiescent zone to some extent.

The molten iron 50 now passes through passages 52 in a partition wall or barrier 54 and enters the oxidation zone 56. Desulfurization also takes place in oxidation zone 56. The capability of the lime slag to absorb sulfur is a function of slag basicity and FeO content. The violent stirring of the fluid in the reduction chamber 40 may result in the desulfurization process being retarded by the high FeO content of the slag, as a result of entrainment of iron droplets which are soon oxidized by the impinging oxygen stream. A substantial portion of the sulfur in the iron may therefore be removed in the quiescent settling zone 48, where FeO in the slag is expected to be low. To enhance slag settling and desulfurization, an inert gas (e.g., nitrogen) is introduced through agitation tuyeres 58 located at the bottom of the reduction chamber 40.

In the oxidation chamber 56, industrial pure oxygen is injected through top lances 60, to oxidize carbon, silicon and phosphorus in the molten iron. The end product is tapped continuously or periodically from a tapping hole 62, into a ladle and is subject to further treatment, if needed. The slag 64 produced at this oxidation stage is disposed of after being tapped periodically from a tapping hole 66. Again, to enhance the oxidation reaction, bottom agitation by oxygen tuyeres 68 is employed.

To compensate for the pressure drop required for molten metal and slag flow and to enable tapping out most of slag and metal prior to furnace shut down for repair, the floor 70 of the horizontal chamber (including reduction and oxidation zones 40 and 56) is inclined slightly toward tapping hole 62. The inclination need only be a small amount, preferably about 3° from the horizontal.

The exhaust gases from the prereduction shaft A and the reduction and oxidation hearth B are integrated and removed through stack C. The exhaust gas passes through a waste heat boiler 72, to convert its latent heat to steam which is used to generate electricity, a cyclone and an electrostatic precipitator 74 to remove the fine dust particles. About half of the clean gas is recycled back to the prereduction shaft after being heated up to about 1200° C. in hot stoves 76, which preferably use another half of the clean gas as fuel in fuel port 78.

Figure 7:
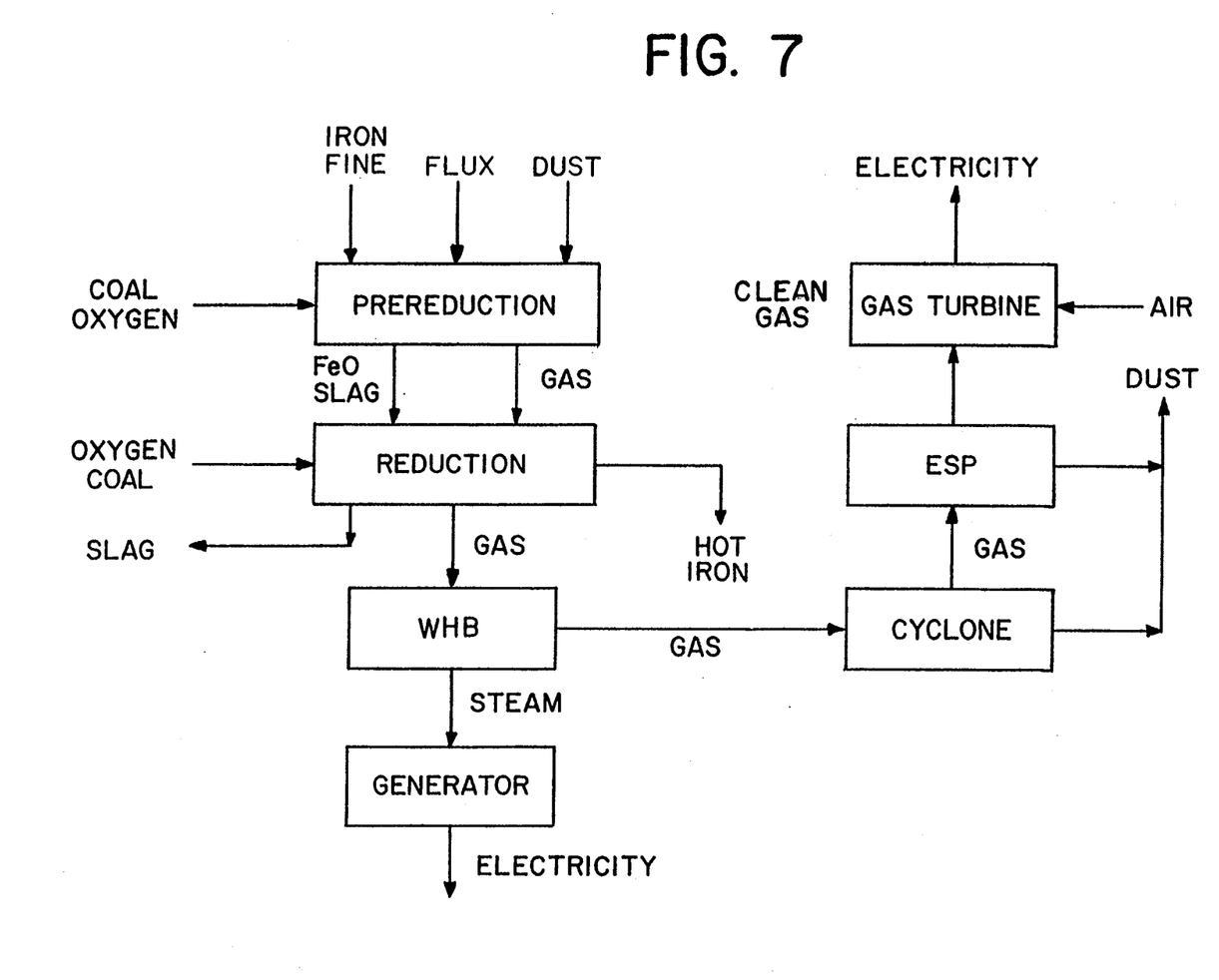
FIGS. 7 and 8 are alternative flow charts of the method of the present invention.

FIG. 7 is a flowsheet showing an alternative embodiment of the method of the invention. In this flowsheet, reducing gas in the prereduction shaft is provided by oxygen-coal burners located at the upper portion of the shaft. While this will certainly increase the specific coal consumption, the hot stoves will be eliminated and, thus, reduce a significant portion of capital cost. When "high energy mode" is the desired option, this embodiment is more preferable than the embodiment shown in FIG. 1.

Figure 8:
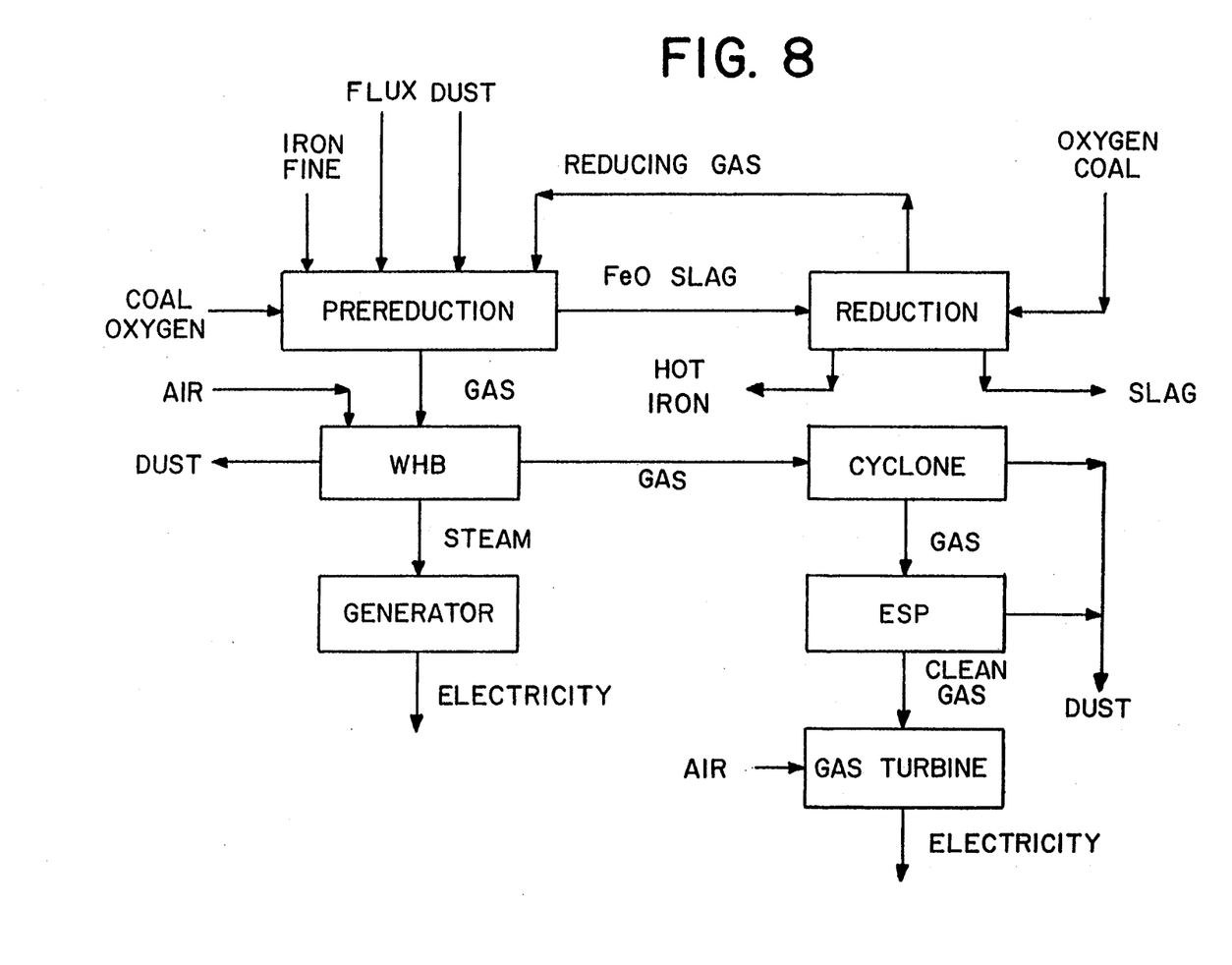

Another alternative embodiment of the method of the present invention is shown in the flowsheet of FIG. 8. This embodiment represents the best possible energy-efficient route of this invention, if iron or steel is the primary product. In this flowsheet, high temperature off-gas (approximately 1700° C.) produced from the final reduction section is recycled directly to the prereduction shaft, while the off-gas produced from the prereduction shaft is removed from the lower portion of the shaft. To make this direct recirculation possible, a barrier or dam between the vertical shaft and the horizontal chamber is required to block the passage of the gases across the barrier, while allowing the liquid slag to enter the reduction chamber. The off-gas removed from the prereduction section passes through a waste heat boiler to release the sensible heat and a gas cleaning system to remove the dust particles. The cleaned gas is used to generate power in a gas turbine.

It should be noted that the embodiments of FIGS. 7 and 8 may be used to produce steel or semi-steel by simply extending the horizontal chamber to include an oxidation portion.

EXAMPLE

In this example, the apparatus described above is used for producing 100 mt of steel per hour. Table 1 (a,b,c) below shows the chemical analysis of the iron concentrate, coal and lime flux. The industrial pure oxygen used in the prereduction, reduction and oxidation sections contains about 95% $O_2$ and 5% $N_2$.

The heat loss from each section of the process vessel is assumed to be 10% of the respective input energy. The heat transfer efficiency in the reduction chamber is assumed to be 80% and the ratio of $CO/CO+CO_2$ at the lower part of the prereduction shaft A is assumed to be 0.5.

TABLE 1

(a). Iron concentrate

| Fe | $SiO_2$ | CaO | $Al_2O_3$ | MgO | $P_2O_5$ |
|---|---|---|---|---|---|
| 65 | 5.9 | 0.5 | 0.3 | 0.3 | 0.1 |

(b). Coal composition

| C | H | N | O | S | Ash | $SiO_2$ in ash |
|---|---|---|---|---|---|---|
| 79.5 | 5.2 | 1.5 | 6.5 | 1.32 | 5.95 | 50 |

(c). Flux composition

| CaO | $SiO_2$ | $CO_2$ |
|---|---|---|
| 98 | 0.5 | 1.5 |

Table 2 shows the target metal and slag temperatures in each processing stage:

TABLE 2

Assumed slag and metal temperatures in each processing stage

| Stage | Slag | Metal |
|---|---|---|
| prereduction | 1350 | — |
| reduction | 1500 | 1470 |
| oxidation | 1570 | 1550 |

On the basis of the above assumption, a heat and mass balance calculation yields the results set forth on Tables 3 and 4. Table 3 shows the weights of the required feed materials as well as the weights of slag and metal produced in each processing stage for producing 100 mt of steel per hour:

TABLE 3

Weights of condensed materials (mt/hr)

| Stages | Iron Concentrate | Flux | Coal | Slag | Hot Metal |
|---|---|---|---|---|---|
| prereduction | 155.4 | 11.69 | 0.57 | 159.2 | — |
| reduction | — | — | 62.98 | 24.76 | 104.1 |
| oxidation | — | 3.49 | — | — | 100 |

Table 4 shows the weights and percentages of gas species in each processing stage:

TABLE 4

Gas volumetric flow rates and compositions

| Stage | | CO | $CO_2$ | $N_2$ | $H_2$ | $H_2O$ | Total |
|---|---|---|---|---|---|---|---|
| prereduction in | 3 NM/hr | 48540 | 45630 | 2073 | 12230 | — | 108500 |
| | % | 44.75 | 42.06 | 1.91 | 11.28 | — | 100 |
| prereduction out | 3 NM/hr | 28030 | 66980 | 2132 | 3495 | 8730 | 109400 |
| | % | 25.62 | 61.24 | 1.95 | 3.20 | 7.99 | 100 |
| Reduction | 3 NM/hr | 91300 | 91300 | 3989 | 24460 | 24460 | 235500 |
| | % | 38.77 | 38.77 | 1.10 | 10.38 | 10.38 | 100 |
| Exhaust | 3 NM/hr | 97090 | 91300 | 4146 | 24460 | 24460 | 241500 |
| | % | 40.21 | 37.81 | 1.72 | 10.13 | 10.13 | 100 |

Table 5 shows the consumptions of industrial pure oxygen in the different processing stages.

TABLE 5

Oxygen Consumption ($NM^3/hr$)

| prereduction | reduction | oxidation | Total |
|---|---|---|---|
| 1042 | 37130 | 3158 | 41330 |

Table 6 shows the coal consumptions for the prereduction and reduction stages under the assumed conditions. The total coal consumption is 610 kg per mt (1000 kg) of hot iron produced. The flue gas has a temperature of above 1500° C. Assume that the exit gas temperature from the waste heat boiler is 300° C.; this gives a total heat of $1.32 \times 10^{11}$ cal/hr, as is released from the flue gas. Assuming 35% being the efficiency for thermal energy converted to electric yields $5.37 \times 10^7$ W for electricity production. By subtracting $1.65 \times 10^7$ W which will be used for oxygen production (assuming 0.4 kwh/$NM^3$ oxygen is required), a net electricity production of $3.72 \times 10^7$ W results which can be used for other purposes.

TABLE 6

Coal Consumption (mt/hr)

| prereduction | reduction | Total |
|---|---|---|
| 0.66 | 63.10 | 63.76 |

It will now be appreciated that the present invention relates to a method and apparatus for continuously converting iron ore and coal into steel or semi-steel in a single sealed vessel. The apparatus requires much less capital investment than the conventional iron and steel-making process route would because of the elimination of coke ovens and sinter plants. It is efficient to operate because material transfer is eliminated and the thermal and chemical energies from the exhaust gases are utilized. Moreover, the process is environmentally safer than conventional processes because the product is produced in a single vessel which comprises three interconnected, well sealed sections.

While only a single preferred embodiment of the present invention has been described for purposes of illustration, it is obvious that many variations and modifications could be made thereto. It is intended to cover all of these modifications and variations which are encompassed by the invention as defined by the claims which follow.

What is claimed:

1. A method of continuously producing steel or semi-steel and energy from fine iron ore concentrate and pulverized coal in a sealed unitary vessel which consists of a vertically extending prereduction section, wherein said prereduction section has an upper portion and a lower portion, and a horizontally extending section for final reduction and refining comprising the steps of:
  (a) reducing fine iron concentrate to wustite in the upper portion of the vertically extending prereduction section of the vessel in the presence of a reducing gas, said reducing gas being introduced from the upper portion of the prereduction section and flowing co-currently with the fine iron ore concentrate;
  (b) melting said wustite in the lower portion of the prereduction section of said vessel so as to covert said wustite into slag containing iron oxide;
  (c) reducing said iron oxide to molten iron in the final reduction section of the vessel in the presence of pulverized coal;
  (d) conducting said molten iron to an oxidation section of said vessel that is integrally connected with said reduction section;
  (e) oxidizing said molten iron contained in said oxidation section in the presence of oxygen so as to remove impurities and convert said molten iron to steel or semi-steel;
  (f) recapturing sensible heat in exhaust gas recovered from steps (c) and (e) and cleaning the exhaust gas forming cleaned gas; and
  (g) introducing at least a portion of said cleaned gas into a gas turbine to generate power.

2. A method for continuously producing molten iron and energy from fine iron ore concentrate and pulverized coal in a sealed unitary vessel which consists of a vertically extending prereduction section, wherein said prereduction section has an upper portion and a lower portion, and a horizontally extending final reduction section comprising the steps of:
  (a) reducing fine iron concentrate to wustite in the upper portion of the vertically extending prereduction section of the vessel in the presence of a reducing gas, said reducing gas being introduced from the upper portion of the prereduction section and flowing co-currently with the fine iron ore concentrate;
  (b) melting said wustite in the lower portion of the prereduction section of said vessel so as to convert said wustite into slag containing iron oxide;
  (c) reducing said iron oxide to molten iron in the final reduction section of the vessel in the presence of pulverized coal;
  (d) recapturing sensible heat in exhaust gas recovering from step (c) and cleaning the exhaust gas to remove any dust particles forming cleaned gas; and
  (e) introducing at least a portion of said cleaned gas into a gas turbine to generate power.

3. The method according to claims 1 or 2, wherein step (a) is performed at a temperature ranging between about 1000° C. and about 1300° C.

4. The method according to claim 3, wherein step (a) is performed at a temperature of about 1200° C.

5. The method according to claims 1 or 2, wherein step (b) is performed at a temperature ranging between about 1300° C. and about 1400° C.

6. The method according to claim 5, wherein step (b) is performed at a temperature of about 1350° C.

7. The method according to claim 1, wherein step (d) is performed at a temperature ranging between about 1500° C. and about 1600° C.

8. The method according to claims 1 or 2, wherein said pulverized coal and oxygen in step (c) is injected into said slag bath.

9. The method according to claims 1 or 2, wherein the exhaust gas produced at step (c) has a post combustion ratio in the final reduction stage ranging between about 20% and about 50%.

10. The method according to claims 1 or 2, wherein step (b) comprises the steps of introducing pulverized coal and oxygen into said wustite contained in the final reduction section of the vessel, permitting the molten iron to settle down in the quiescent zone of the final reduction section, and providing agitation gas into said final reduction section from the bottom of the vessel.

11. The method according to claim 1, wherein steps (d) and (e) comprise the steps of permitting the molten iron to pass through a passage in the lower portion of a barrier between the reduction and oxidation sections of the vessel into the oxidation section, introduction oxygen into said oxidation section, and providing agitation gas into said oxidation section from the bottom of the vessel.

12. The method according to claims 1 or 2, further comprising the steps of heating a portion of the cleaned exhaust gas and recycling said gas to the upper portion of the prereduction section.

13. The method according to claims 1 or 2, further comprising the steps of removing exhaust gas produced in the prereduction section from the lower portion of said section and recycling the exhaust gas produced in the final reduction section directly into the upper portion of the prereduction section.

14. The method according to claims 1 or 2, wherein the reducing gas and fine iron concentrated are heated to a temperature ranging between about 1100° C. and about 1400° C. with oxygen-coal burners located at the upper portion of the prereduction section.

15. The method according to claims 1 or 2, wherein step (a) comprises the steps of charging a particulate mixture of iron ore concentrate and pulverized flux into the upper portion of the vertically extending prereduction section of the vessel, introducing reducing gas at a temperature ranging between about 1100° and about 1300° C. into the upper portion of the prereduction section to heat and to partially reduce the iron ore concentrate to wustite, and providing heat to melt the wustite to form slag containing iron oxide in the lower portion of the prereduction section of the vessel.

16. The method according to claim 15, wherein the step of introducing a mixture of fine particles comprises the step of charging a hopper with fine particles of dry iron ore concentrate and flux from feed bins by screw conveyors, the hopper having an outlet connected to the inlet of the upper portion of the prereduction section of the vessel.

17. The method according to claim 16, comprising the step of introducing a cold distribution gas into the inlet of the upper portion of said prereduction section.

18. The method according to claim 17, wherein said cold distribution gas has the same composition as the hot reducing gas.

19. The method according to claim 16, further comprising the step of cooling the outlet of the hopper.

20. The method according to claim 16, further comprising the step of radially directing the particles of iron one concentrate and flux as the particles enter the upper portion.

* * * * *